(12) United States Patent
Mori et al.

(10) Patent No.: US 10,100,711 B2
(45) Date of Patent: Oct. 16, 2018

(54) ELECTRIC VEHICLE

(71) Applicant: TOYOTA JIDOSHA KABUSHIKI KAISHA, Toyota-shi, Aichi-ken (JP)

(72) Inventors: Nobuhito Mori, Nissin (JP); Masanori Miyakawa, Yamato (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/729,246

(22) Filed: Oct. 10, 2017

(65) Prior Publication Data

US 2018/0119598 A1    May 3, 2018

(30) Foreign Application Priority Data

Oct. 31, 2016 (JP) .................. 2016-212853

(51) Int. Cl.
| | |
|---|---|
| B60K 1/00 | (2006.01) |
| F01P 11/08 | (2006.01) |
| F16H 57/021 | (2012.01) |
| F16H 57/04 | (2010.01) |
| B60K 11/04 | (2006.01) |
| B60K 17/16 | (2006.01) |
| F16H 57/03 | (2012.01) |

(52) U.S. Cl.
CPC .............. *F01P 11/08* (2013.01); *B60K 11/04* (2013.01); *B60K 17/165* (2013.01); *F16H 57/021* (2013.01); *F16H 57/0409* (2013.01); *F16H 57/0424* (2013.01); *F16H 57/0427* (2013.01); *B60K 2001/001* (2013.01); *B60K 2001/006* (2013.01); *B60Y 2400/202* (2013.01); *F16H 57/03* (2013.01); *F16H 57/0471* (2013.01); *F16H 2700/00* (2013.01)

(58) Field of Classification Search
CPC .......... F16H 3/66; F16H 1/32; F16H 57/0447; F16H 57/045; F16H 57/0424; F16H 57/021; F16H 57/08; B60K 1/00; B60K 11/04; B60K 17/165
See application file for complete search history.

(56) References Cited

U.S. PATENT DOCUMENTS

| | | | | |
|---|---|---|---|---|
| 4,479,404 A | * | 10/1984 | Stockton | F16H 3/66 475/149 |
| 5,591,099 A | * | 1/1997 | Tsukamoto | F16H 3/66 475/292 |

(Continued)

FOREIGN PATENT DOCUMENTS

| | | |
|---|---|---|
| EP | 3009288 A1 | 4/2016 |
| JP | 2016-121733 A | 7/2016 |

*Primary Examiner* — Hau V Phan
(74) *Attorney, Agent, or Firm* — Oliff PLC

(57) ABSTRACT

An electric vehicle includes a driving device including an electric motor and a mechanism transmitting a driving force from the electric motor to a rear wheel axle, which are accommodated in a case, a first oil cooler configured to cool oil in the case, the first oil cooler being disposed behind the rear wheel axle, and a second oil cooler configured to cool the oil in the case, the second oil cooler being disposed behind the rear wheel axle. The driving device is disposed in a rear portion of the vehicle such that the driving device crosses the rear wheel axle. The second oil cooler is disposed at a position misaligned in a vehicle front-rear direction with respect to the first oil cooler.

4 Claims, 3 Drawing Sheets

(56) References Cited

U.S. PATENT DOCUMENTS

| | | | | |
|---|---|---|---|---|
| 8,899,381 B2* | 12/2014 | Ebihara | ............... | B60K 7/0007 |
| | | | | 184/6.12 |
| 9,746,068 B2* | 8/2017 | Tahara | ............... | F16H 57/0424 |
| 2006/0042843 A1* | 3/2006 | Yasuda | ............... | A01D 69/002 |
| | | | | 180/65.1 |
| 2008/0135209 A1 | 6/2008 | Lowe et al. | | |
| 2010/0236845 A1* | 9/2010 | Ishii | ...................... | A01D 34/66 |
| | | | | 180/65.6 |
| 2011/0041649 A1* | 2/2011 | Iwata | ................. | F16H 57/0447 |
| | | | | 74/606 R |
| 2011/0245010 A1* | 10/2011 | Nobata | .............. | F16H 57/0457 |
| | | | | 475/160 |
| 2012/0329596 A1* | 12/2012 | Nomura | .................... | F16H 1/32 |
| | | | | 475/149 |
| 2015/0051768 A1* | 2/2015 | Miyamoto | ........ | F16H 57/0476 |
| | | | | 701/22 |
| 2015/0152954 A1* | 6/2015 | Kajikawa | ............. | F16H 57/045 |
| | | | | 475/150 |
| 2016/0186854 A1 | 6/2016 | Tahara et al. | | |

\* cited by examiner

ELECTRIC VEHICLE

INCORPORATION BY REFERENCE

The disclosure of Japanese Patent Application No. 2016-212853 filed on Oct. 31, 2016 including the specification, drawings and abstract is incorporated herein by reference in its entirety.

BACKGROUND

1. Technical Field

The disclosure relates to an electric vehicle and, more particularly, to an electric vehicle in which a driving device is disposed in a rear portion of the electric vehicle such that the driving device having an electric motor and a mechanism transmitting power from the electric motor to the rear wheel axle which are accommodated in a case crosses a rear wheel axle.

2. Description of Related Art

In the related art, a transaxle is known in which an electric motor as a driving source and a mechanism (such as a reduction gear and a differential gear device) transmitting power from the electric motor to an axle are integrated with each other by being accommodated in a single case.

For example, Japanese Unexamined Patent Application Publication No. 2016-121733 (JP 2016-121733 A) discloses a layout in which a rear transaxle is disposed in a rear portion of an electric four-wheel drive vehicle such that the rear transaxle crosses a rear wheel axle. The rear transaxle includes an electric motor, a first reduction gear pair, a second reduction gear pair, and a differential gear device, which are integrated and are accommodated in a transaxle case.

SUMMARY

In the electric vehicle that uses the electric motor as a driving source, the electric motor is cooled by, for example, oil in the transaxle case being used as a cooling medium so that the temperature of the heat-generating electric motor remains below a predetermined temperature. In this case, the oil in the transaxle case is usually cooled by oil coolers so as to ensure a motor cooling performance.

In a case where the transaxle is disposed in the rear portion of the vehicle as in JP 2016-121733 A, it is conceivable that the oil coolers are disposed in the rear portion of the vehicle instead of a front portion of the vehicle that traveling wind reaches. This is to shorten oil passages connecting the oil coolers and the transaxle case in the interest of loss reduction or the like. Also conceivable in this case is that the oil coolers are disposed on a rear side of the rear portion of the vehicle to the maximum extent possible, which is to guide air flowing in from the rear side of the vehicle to the oil coolers.

In a case where the oil coolers are disposed at such a position, however, a total loss of the oil coolers arises due to a collision load during a vehicle rear collision. This total loss causes a problem that it is difficult to maintain the motor cooling performance.

The disclosure provides a technique for suppressing a total loss of oil coolers at a vehicle rear collision in an electric vehicle in which a driving device including an electric motor is disposed in a rear portion of the vehicle.

The electric vehicle is provided with two oil coolers, and one of the two oil coolers is disposed at a position that is likely to be exposed to a collision load earlier than the other one during the vehicle rear collision, so that the impact on the other cooler is alleviated.

Specifically, an aspect relates to an electric vehicle including a driving device including an electric motor and a mechanism transmitting a driving force from the electric motor to a rear wheel axle, the electric motor and the mechanism being accommodated in a case, a first oil cooler configured to cool oil in the case, the first oil cooler being disposed behind the rear wheel axle, the second oil cooler being disposed behind the rear wheel axle. The driving device is disposed in a rear portion of the vehicle such that the driving device crosses the rear wheel axle. The second oil cooler is disposed at a position misaligned in a vehicle front-rear direction with respect to the first oil cooler.

According to the aspect, the first oil cooler and the second oil cooler are disposed at the positions misaligned in the vehicle front-rear direction, and thus one of the first and second oil coolers that has a relatively rearward disposition (hereinafter, referred to as one oil cooler in some cases) in comparison to the other oil cooler is exposed to a collision load earlier than the other oil cooler during a vehicle rear collision. Accordingly, an impact on the other oil cooler that has a relatively forward disposition (hereinafter, referred to as the other oil cooler in some cases) is alleviated. As a result, a total loss of the oil coolers during the vehicle rear collision can be suppressed and cooling of the electric motor can be continuously performed at least by the other oil cooler. Accordingly, the electric vehicle is capable of performing limp home traveling.

In the aspect, the first oil cooler and the second oil cooler may be disposed such that an end face of the first oil cooler which faces toward a rear side of the vehicle is positioned misaligned in the vehicle front-rear direction with respect to an end face of the second oil cooler which faces toward the rear side of the vehicle.

In the aspect, the electric vehicle may further include a first oil passage connecting the first oil cooler and the case and a second oil passage connecting the second oil cooler and the case. The second oil passage is different from the first oil passage.

According to the aspect, the other oil cooler remains connected to the case via the separate oil passage even when the one oil cooler and the oil passage connecting the one oil cooler and the case are broken during the vehicle rear collision. Accordingly, the other oil cooler is capable of avoiding effects of the breakage of the one oil cooler and the like. As a result, the cooling of the electric motor can be continuously performed even after the vehicle rear collision.

In the aspect, the electric vehicle may further include a first pump configured to supply the oil from the first oil cooler to the electric motor accommodated in the case, the first pump being disposed on the first oil passage, and a second pump configured to supply the oil from the second oil cooler to the electric motor accommodated in the case, the second pump being disposed on the second oil passage.

With the electric vehicle according to the aspect, a total loss of oil coolers during a vehicle rear collision can be suppressed as described above.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described with reference to accompanying drawings.

Figure 1:
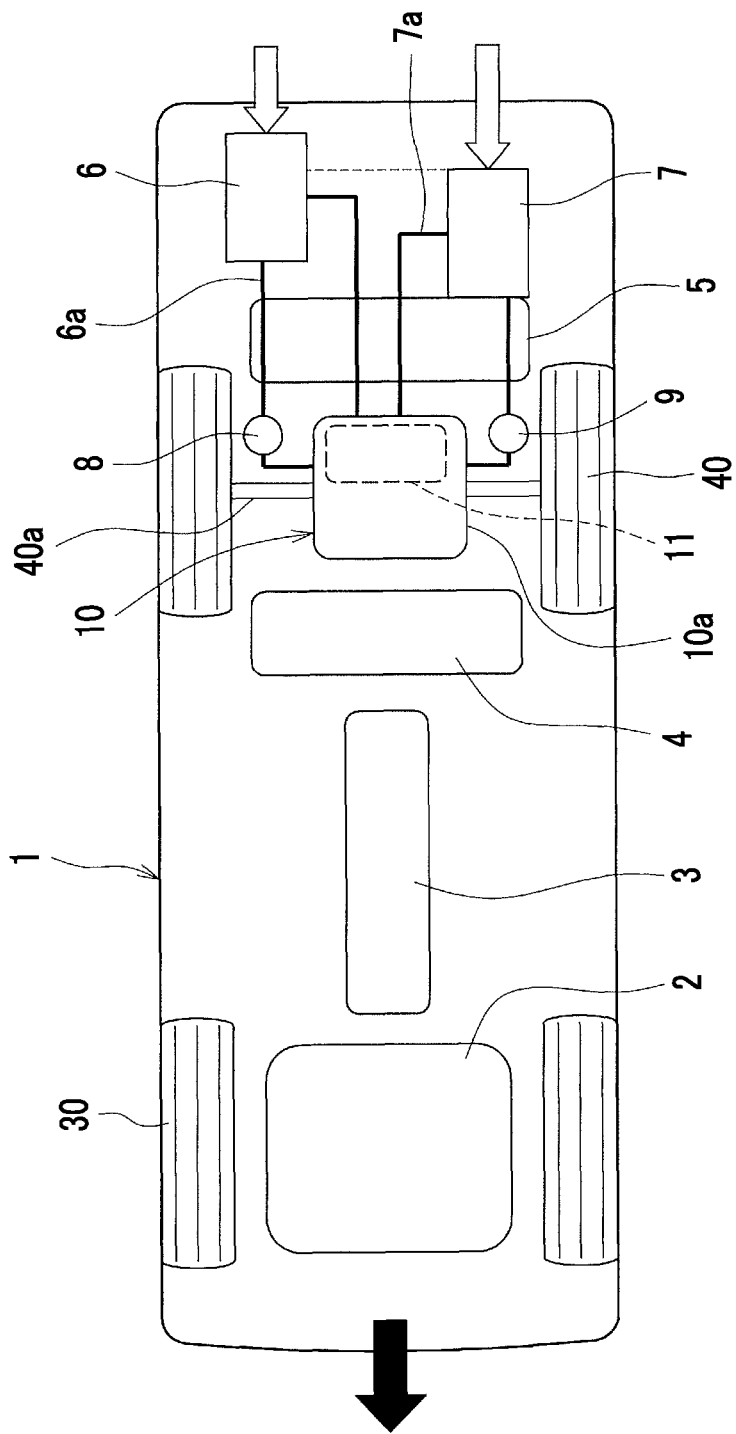
FIG. 1 is a diagram schematically illustrating an electric vehicle according to an embodiment.

FIG. 1 is a diagram schematically illustrating an electric vehicle 1 according to the embodiment. The black arrow in FIG. 1 shows the front side of the vehicle. The electric vehicle 1 is a rear-wheel drive fuel cell vehicle. As illustrated in FIG. 1, the electric vehicle 1 is provided with a fuel cell stack 2 disposed in a front portion of the vehicle, first to third fuel tanks 3, 4, 5, a transaxle 10 disposed in a rear portion of the vehicle, first and second oil coolers 6, 7 cooling oil in a transaxle case 10a, first and second pumps 8, 9, front wheels 30 as driven wheels, and rear wheels 40 as driving wheels.

The fuel cell stack 2 is accommodated in an accommodating chamber. The accommodating chamber is disposed in the front portion of the vehicle and is partitioned from the vehicle cabin by a dash panel (not illustrated). The fuel cell stack 2 is an electric power generation device that generates electric energy by which the electric vehicle 1 is driven. The fuel cell stack 2 generates the electric energy by using a chemical reaction between oxygen in air and hydrogen supplied from the first to third fuel tanks 3, 4, 5. The fuel cell stack 2 is formed by stacking a plurality of cells. An electrode composite is interposed between separators in each of the cells. In the electrode composite, a hydrogen electrode catalyst is applied to one surface of a solid polymer electrolyte membrane and an oxygen electrode catalyst is applied to the other surface of the solid polymer electrolyte membrane.

The fuel cell stack 2 is electrically connected to an electric motor 11 (described later) via a DC/DC converter (not illustrated) and an inverter (not illustrated). As a result, the voltage from the fuel cell stack 2 is boosted by the DC/DC converter, the direct current from the DC/DC converter is converted into an alternating current by the inverter, and then the alternating current is supplied to the electric motor 11.

The fuel cell vehicle needs to be loaded with an increasing amount of fuel for the cruising distance (maximum traveling distance per refueling or the like) of the fuel cell vehicle to increase. Installation of a relatively large fuel tank, however, hinders effective vehicle space utilization. Accordingly, in the electric vehicle 1 according to the embodiment, the three relatively small fuel tanks are installed in three different places. Specifically, the electric vehicle 1 is provided with the first fuel tank 3, the second fuel tank 4, and the third fuel tank 5. The first fuel tank 3 is disposed in a middle portion of the vehicle and extends in a vehicle front-rear direction. The second fuel tank 4 is disposed in front of the transaxle 10 and extends in a vehicle width direction. The third fuel tank 5 is disposed behind the transaxle 10 and extends in the vehicle width direction. The first to third fuel tanks 3, 4, 5 are connected to each other with a pipe (not illustrated) and are configured to supply the fuel cell stack 2 with the hydrogen with which the fuel tanks 3, 4, 5 are filled.

Figure 2:
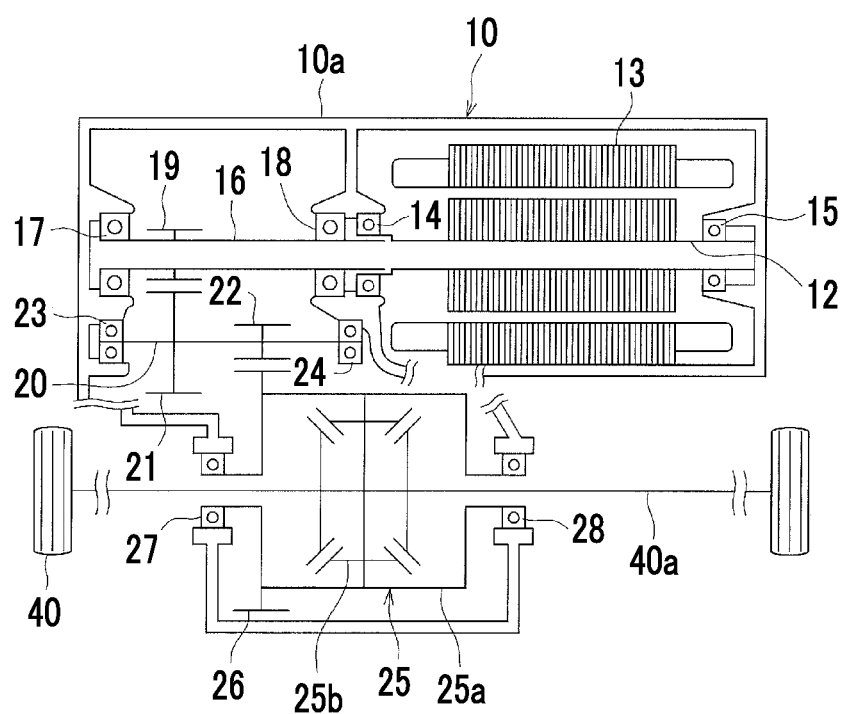
FIG. 2 is a skeleton diagram showing a schematic configuration of a transaxle.

FIG. 2 is a skeleton diagram showing a schematic configuration of the transaxle 10. As illustrated in FIG. 2, the transaxle (driving device) 10 has the electric motor 11 as a driving source, a pair of first reduction gears 19, 21, a pair of second reduction gears 22, 26, and a differential gear device 25. In the transaxle 10, the elements are integrated by being accommodated in the single case (transaxle case) 10a. As illustrated in FIG. 1, the transaxle 10 is disposed in the rear portion of the vehicle such that a rear wheel axle 40a crosses the transaxle 10. The transaxle 10 is configured to transmit the driving force that is generated by the electric motor 11 to the rear wheel axle 40a via the pair of first reduction gears 19, 21, the pair of second reduction gears 22, 26, and the differential gear device 25.

The electric motor 11 has a rotor shaft 12 and a stator 13 that is fixed to the transaxle case 10a to surround the outer periphery of the rotor shaft 12. The rotor shaft 12 is rotatably supported by the transaxle case 10a via a pair of bearings 14, 15 mounted on both ends of the rotor shaft 12. An output shaft 16, which is connected to the rotor shaft 12, is rotatably supported by the transaxle case 10a via a pair of bearings 17, 18 mounted on both ends of the output shaft 16. The output shaft 16 rotates together with the rotor shaft 12.

The small-diameter counter drive gear 19 and the large-diameter counter driven gear 21 constitute the pair of first reduction gears 19, 21. The counter drive gear 19 is disposed in a first end portion of the output shaft 16 (end portion on the side that is opposite to the electric motor 11). The counter driven gear 21 is disposed in a first end portion of a counter shaft 20 that is parallel to the output shaft 16 (end portion on the side that is opposite to the electric motor 11) and meshes with the counter drive gear 19. The counter shaft 20 is rotatably supported by the transaxle case 10a via a pair of bearings 23, 24 mounted on both ends of the counter shaft 20.

The small-diameter final drive gear 22 and the large-diameter final driven gear 26 constitute the pair of second reduction gears 22, 26. The final drive gear 22 is disposed in a second end portion of the counter shaft 20 (end portion on the electric motor 11 side). The final driven gear 26 is integrally fixed to an outer peripheral portion of a differential case 25a and meshes with the final drive gear 22. The differential case 25a and the final driven gear 26 integrally fixed to the differential case 25a are rotatably supported by the transaxle case 10a via the bearings 27, 28 mounted on both axial end portions of the differential case 25a.

The differential gear device 25 has the differential case 25a and a so-called bevel gear-type differential mechanism 25b accommodated in the differential case 25a. The differential gear device 25 is configured to transmit the driving force to a pair of the rear wheel axles 40a while allowing a difference in rotation speed.

In the electric vehicle 1 that has the configuration described above, the fuel cell stack 2 generates electric power by the hydrogen being supplied from the first to third fuel tanks 3, 4, 5 and the electric motor 11 is driven by the electric energy from the fuel cell stack 2. The driving force generated by the electric motor 11 is transmitted to the differential gear device 25 via the pair of first reduction gears 19, 21 and the pair of second reduction gears 22, 26 and is transmitted from the differential gear device 25 to the rear wheels 40 via the rear wheel axles 40a.

As illustrated in FIG. 1, the first oil cooler 6 and the second oil cooler 7 are disposed behind the third fuel tank 5, which is disposed behind the rear wheel axles 40a. The first oil cooler 6 and the second oil cooler 7 are connected to the transaxle case 10a via separate oil passages 6a, 7a, respectively. A wind guide port (not illustrated) for guiding air (cooling wind) is formed in a rear end portion of the electric vehicle 1. As illustrated by the outlined arrows in FIG. 1, the air flowing into the rear portion of the vehicle from the wind guide port because of a difference in pressure in the back of the vehicle reaches the first and second oil coolers 6, 7, and then the oil is cooled by heat exchange with the air.

The first oil cooler 6, which is disposed on the right side in the vehicle width direction, is connected to the transaxle case 10a via the first oil passage 6a. After the oil is cooled in the first oil cooler 6 by the heat exchange with the air, the oil is forcibly supplied to the electric motor 11 in the transaxle case 10a by the first pump 8 disposed on the first oil passage 6a being driven. The second oil cooler 7, which is disposed on the left side in the vehicle width direction, is connected to the transaxle case 10a via the second oil passage 7a. After the oil is cooled in the second oil cooler 7 by the heat exchange with the air, the oil is forcibly supplied, independently of the cooling oil supply from the first oil cooler 6, to the electric motor 11 in the transaxle case 10a by the second pump 9 disposed on the second oil passage 7a being driven. The first pump 8 and the second pump 9 may be mechanical pumps driven by the driving force of the electric motor 11 being used or may be electric pumps driven by the electric energy generated by the fuel cell stack 2.

In the electric vehicle 1 according to the embodiment, the first and second oil coolers 6, 7 are disposed in the rear portion of the vehicle to be behind the transaxle 10 disposed in the rear portion of the vehicle as described above. Accordingly, the first and second oil passages 6a, 7a can be shortened. As a result, weight reduction, cost reduction, and loss reduction can be achieved. In addition, a motor cooling performance can be ensured by the disposition of the two oil coolers 6, 7 although traveling wind does not directly hit the oil coolers unlike in a case where the oil coolers are disposed in the front portion of the vehicle.

Furthermore, breakage of the first and second oil coolers 6, 7 attributable to contact with foreign matter and stones flying to the vehicle can be suppressed because the first and second oil coolers 6, 7 are disposed behind the rear wheel axles 40a in the rear portion of the vehicle. The first and second oil coolers 6, 7 are disposed behind the rear wheel axles 40a, that is, on the rear side of the vehicle to the maximum extent possible, and thus the air flowing into the rear portion of the vehicle is likely to reach the first and second oil coolers 6, 7 and the effect of wind guiding toward the first and second oil coolers 6, 7 can be enhanced.

Figure 3:
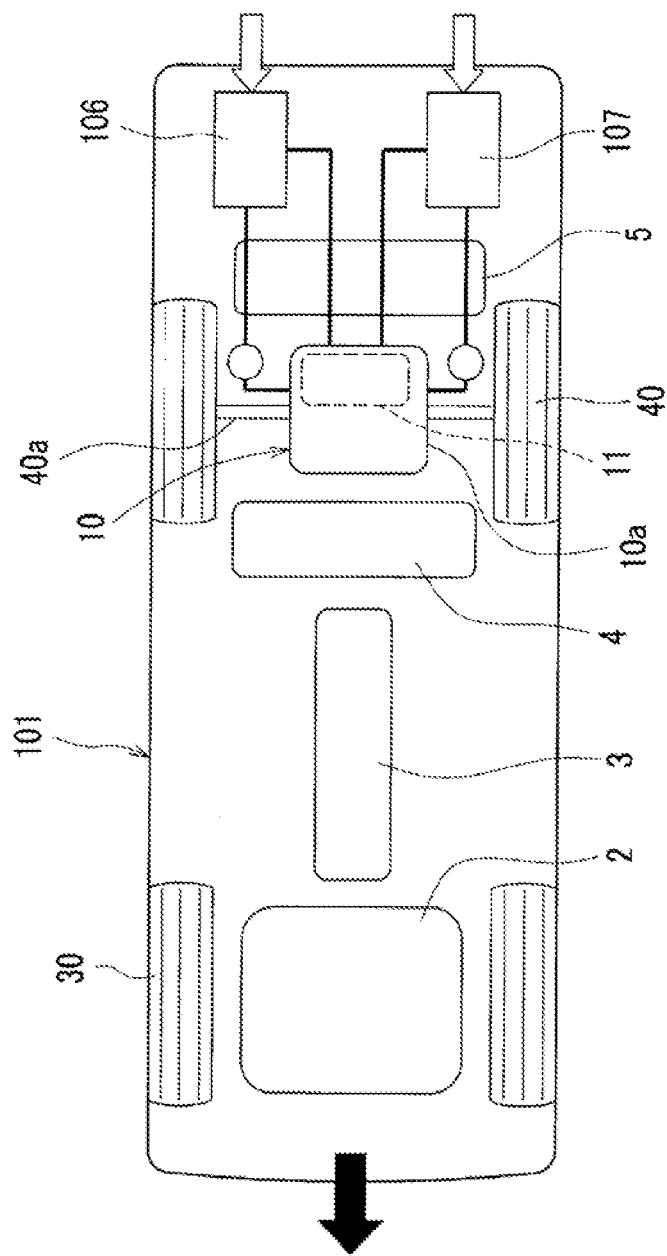
FIG. 3 is a diagram schematically illustrating a layout example of an oil cooler in the electric vehicle.

When two oil coolers 106, 107 are disposed at the same positions (bilaterally symmetrical positions) in the vehicle front-rear direction as in an electric vehicle 101 illustrated in FIG. 3, the two oil coolers 106, 107 are broken alike (total loss of the oil coolers arises) during a vehicle rear collision and little motor cooling performance is ensured in some cases.

In the electric vehicle 1 according to the embodiment, however, one of the oil coolers is disposed at a position that is likely to be exposed to a collision load earlier than the other one during a vehicle rear collision. Accordingly, the impact on the other oil cooler can be alleviated and at least the other oil cooler is capable of surviving the collision. Specifically, the first oil cooler 6 of the electric vehicle 1 according to the embodiment is disposed at a position misaligned in the vehicle front-rear direction with respect to the second oil cooler 7 as illustrated in FIG. 1. More specifically, the first and second oil coolers 6, 7 are disposed such that the end face (rear end) of the first oil cooler 6 that is on the rear side of the vehicle is behind the end face (rear end) of the second oil cooler 7 that is on the rear side of the vehicle (refer to the dashed line in FIG. 1).

Since the first oil cooler 6 and the second oil cooler 7 are disposed at the positions that are misaligned in the vehicle front-rear direction as described above, the first oil cooler 6, which is one of the first and second oil coolers 6, 7 that has a relatively rearward disposition, is exposed to the collision load earlier than the second oil cooler 7 during the vehicle rear collision. Accordingly, the first oil cooler 6 itself is likely to be broken during the collision. Nevertheless, since the first oil cooler 6 receives the collision load earlier than the second oil cooler 7, the impact on the second oil cooler 7, which has a relatively forward disposition, is alleviated unlike in the case where the two oil coolers 106, 107 are disposed at the same positions in the vehicle front-rear direction. As a result, at least the second oil cooler 7 survives the collision, and thus the total loss of the oil coolers during the vehicle rear collision (breakage of both the first oil cooler 6 and the second oil cooler 7) can be suppressed and cooling of the electric motor 11 can be continuously performed by the second oil cooler 7. Accordingly, the electric vehicle 1 is capable of performing limp home traveling.

As described above, the first and second oil coolers 6, 7 are connected to the transaxle case 10a via the separate oil passages 6a, 7a, respectively. In other words, no common oil passage connects the first and second oil coolers 6, 7 to the transaxle case 10a. Accordingly, the unbroken second oil cooler 7 is capable of avoiding effects of the breakage of the first oil cooler 6, the first oil passage 6a, and the first pump 8. As a result, the cooling oil supply from the second oil cooler 7 to the transaxle case 10a via the second oil passage 7a continues to be performed even when the first oil cooler 6, the first oil passage 6a, and the first pump 8 are broken during the vehicle rear collision, and thus the electric motor 11 can be cooled in a more reliable way.

Another Embodiment

The disclosure is not limited to the embodiment described above and can take various forms without departing from its spirit or key features.

In the embodiment described above, the first oil cooler 6 disposed on the right side in the vehicle width direction is disposed at the position misaligned with respect to and behind the second oil cooler 7 disposed on the left side in the vehicle width direction. However, the disclosure is not limited thereto. For example, the first oil cooler 6 disposed on the right side in the vehicle width direction may be disposed at a position misaligned with respect to and ahead of the second oil cooler 7 disposed on the left side in the vehicle width direction.

As described above, the embodiment is merely an example in every respect and the embodiment should not be interpreted restrictively. In addition, any modification or change belonging to a scope equivalent to the scope of claims is within the scope of the disclosure.

With the disclosure, a total loss of oil coolers can be suppressed during a vehicle rear collision. Accordingly, the disclosure can be applied in a highly beneficial way to an electric vehicle in which a driving device is disposed in a rear portion of the electric vehicle such that a rear wheel axle crosses the driving device in which an electric motor and a mechanism transmitting a driving force from the electric motor to the rear wheel axle are accommodated in a case.

What is claimed is:

1. An electric vehicle comprising:
a driving device including an electric motor and a mechanism transmitting a driving force from the electric motor to a rear wheel axle, the electric motor and the mechanism being accommodated in a case, and the driving device being disposed in a rear portion of the vehicle such that the driving device crosses the rear wheel axle;
a first oil cooler configured to cool oil in the case, the first oil cooler being disposed behind the rear wheel axle; and
a second oil cooler configured to cool the oil in the case, the second oil cooler being disposed behind the rear wheel axle and disposed at a position misaligned in a vehicle front-rear direction with respect to the first oil cooler.

2. The electric vehicle according to claim 1, wherein the first oil cooler and the second oil cooler are disposed such that an end face of the first oil cooler which faces toward a rear side of the vehicle is positioned misaligned in the vehicle front-rear direction with respect to an end face of the second oil cooler which faces toward the rear side of the vehicle.

3. The electric vehicle according to claim 1, further comprising:
a first oil passage connecting the first oil cooler and the case; and
a second oil passage connecting the second oil cooler and the case, and the second oil passage being different from the first oil passage.

4. The electric vehicle according to claim 3, further comprising:
a first pump configured to supply the oil from the first oil cooler to the electric motor accommodated in the case, the first pump being disposed on the first oil passage; and
a second pump configured to supply the oil from the second oil cooler to the electric motor accommodated in the case, the second pump being disposed on the second oil passage.

* * * * *